ABSTRACT OF THE DISCLOSURE

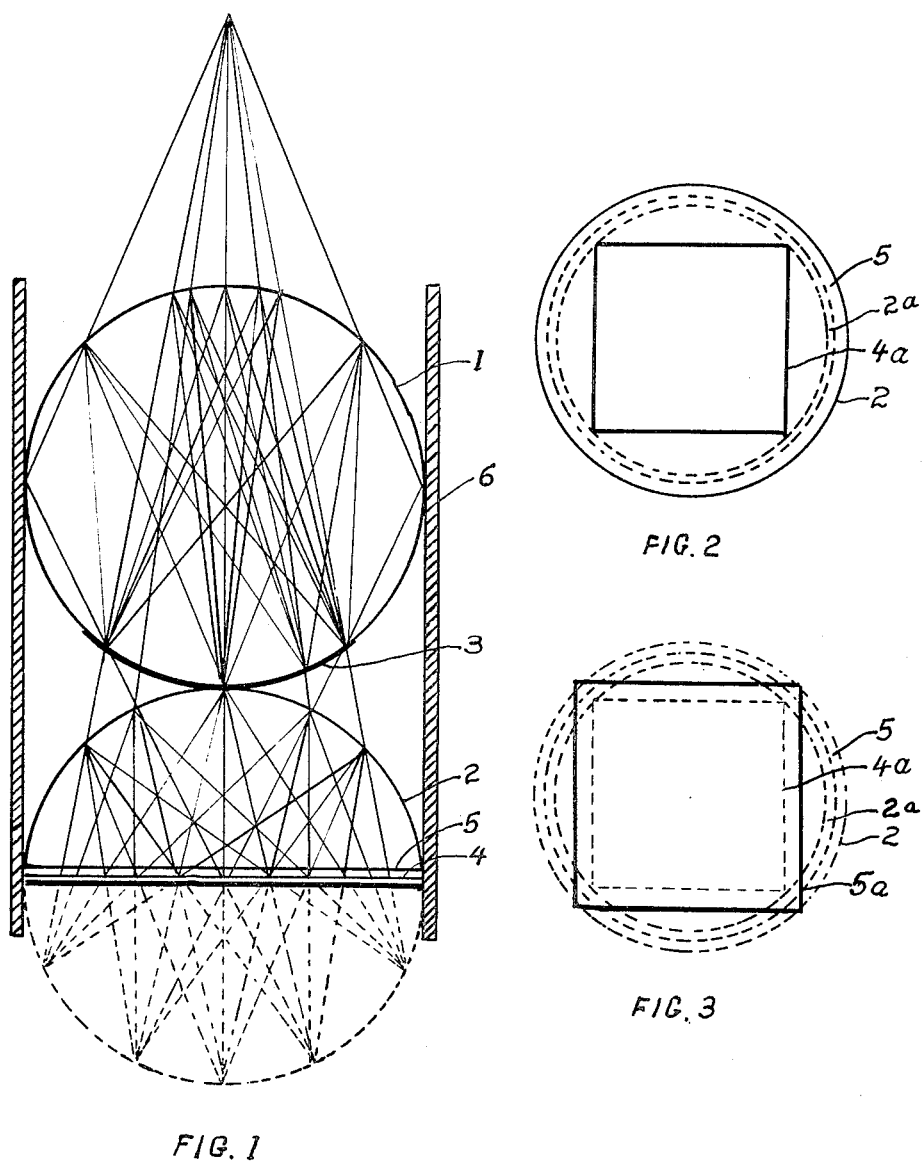

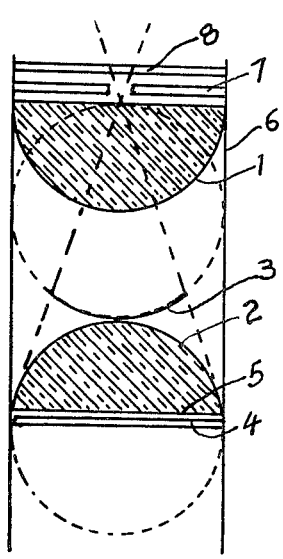
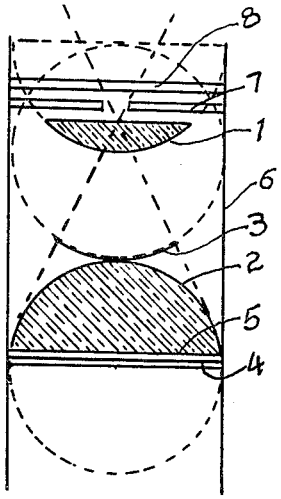
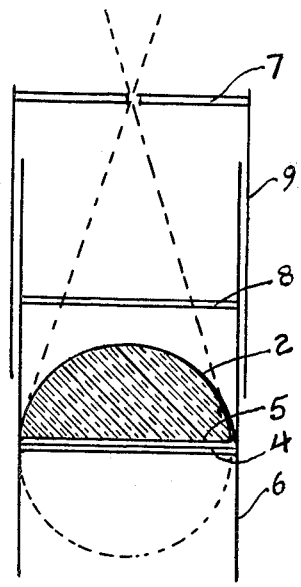
FIG. 4     FIG. 5     FIG. 6
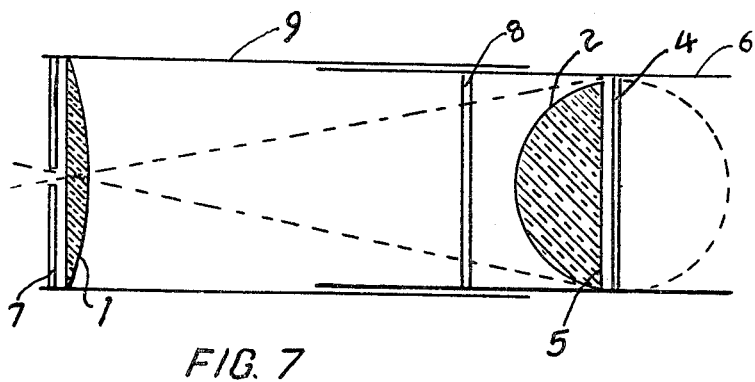
FIG. 7
INVENTOR.
John Jacob Vanderhooft INVENTOR.
John Jacd Vanderhooft 3,389,633
OPTICAL SYSTEMS
John Jacob Vanderhooft, 121 Lincoln Ave.,
Brooklyn, N.Y. 11208
Filed Dec. 17, 1964, Ser. No. 419,119
8 Claims. (Cl. 88—24)

This invention consists of a simplified means for providing an eye piece for an optical system, comprising an objective element and a corrective element, each being a sphere or a portion of a sphere or a plano-convex element, with a photographic impression being obtainable from the corrective element by placing a photosensitive medium in close contact with the plano surface of the corrective element. The unique nature of this invention is its capacity for maintaining focus from object to infinity.

---

My invention relates to simplified optical means in a highly specialized and complicated field of optics where theories and general beliefs are deeply rooted.

I attain these objects by exploring the human eye, which is composed of two optical elements, the eye lens, which is partly imbedded in the eyeball, is the objective element and the eyeball or sphere is the corrective element.

By employing two transparent spheres and placing the spheres in close relationship to each other I find that a corrected image appears in part of the second sphere.

By cutting the sphere at the point where the corrected image appears a photographic impression can be obtained by placing a photo-sensitive medium in close contact with the cut part of the sphere. Like the human eye this spheric optical system is in focus from object to infinity. I also find that modifications of the objective element is possible which is shown in the accompanying drawings in which:

FIG. 1 is a diagrammatic optic description of discovery.

FIG. 2 is a half-cut sphere showing the refraction band or zone and maximum picture area.

FIG. 3 is the same as FIG. 2 with part of the corrective element cut away for easy mounting.

FIG. 4 is a modification of the objective element.

FIG. 5 is a further modification of the objective element.

FIG. 6 is a means to utilize a single corrective element with the use of an iris diaphragm.

FIG. 7 is a telescopic means employing a long focus objective element.

Figure 8:
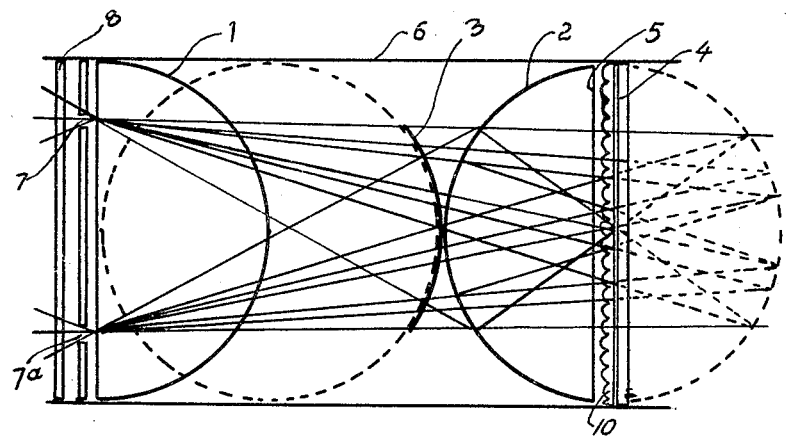
FIG. 8 is a method to take direct view stereoscopic pictures.

In FIG. 1, the objective element 1 consists of a sphere mounted in close contact, or nearly so with the corrective element 2 which is part of a sphere. The light rays entering the objective element 1 come to a focus at the base of sphere 1 where they form an image 3 showing curvature of field. As the rays continue on through the corrective element 2 they come to a focus at the base of sphere 2 to form an upright image which is shown in dotted lines. An inversion from an upside down to an upright image takes place at line 4 where a corrected inverted image appears. By cutting the sphere 2 slightly above line 4 a photo-sensitive medium may be placed on line 4 where the corrected image appears, without touching the base of corrective element 2. The objective element 1 and corrective element 2 are mounted in an enclosure 6 to form an optical system composed of two elements. 5 is base of corrective element.

In FIG. 2, the base 5 of corrective element 2 shows refraction band 2a and maximum picture area 4a.

In FIG. 3, 5a shows where the corrective element may be cut for easy mounting.

In FIG. 4, objective element 1 is a half-cut of sphere 1 as shown in FIG. 1, mounted with the base facing toward the incoming light rays and spaced a distance away from corrective element 2, equal to half the diameter of the sphere. An image showing curvature of field is produced at 3 directly in front of corrective element 2 and a corrected inverted image appears at line 4, where photosensitive medium 4 is placed. The iris diaphragm 7 and shutter 8 is located in front of objective element 1 mounted in a suitable enclosure 6.

In FIG. 5, the objective element 1 is a plano-convex lens, having the same curvature as corrective element 2 with a space between the two elements equal to half the diameter of the sphere. As in FIG. 4 image 3 shows curvature of field, a corrected image is recorded at line 4. The iris diaphragm 7 and shutter 8 are mounted directly in front of objective element 1.

In FIG. 6, corrective element 2, and shutter 8 are mounted in a suitable enclosure. FIG. 6 has no objective element. The iris diaphragm 7 which is mounted in a telescoping enclosure 9, is utilized as a pinhole shield. This method produces a corrected image on line 4 and allows for zooming of the picture.

In FIG. 7, the only difference between FIG. 6 and FIG. 7 is the mounting of a long focus objective element 1 directly behind the iris diaphragm 7 which permits the taking of tele-photo pictures. In FIG. 8, the same optical arrangement is used as in FIG. 4, with this difference; the diameter of the spheric elements must be larger to permit the placing of two light gathering members 7 and 7a spaced about 2½ inches apart. A lenticulated ribbed screen 10 is placed at the base 5 of corrective element 2 with the ribs facing toward the incoming light rays, the photo-sensitive medium 4 is placed in close contact with the lenticulated ribbed screen 10. The function of the ribs which may be considered as tiny half-spheres is to break up the light rays entering through the two light gathering members 7 and 7a into right and left picture bands, a composite of which can be viewed through a similar ribbed screen as a direct view stereoscopic picture.

Figure 9:
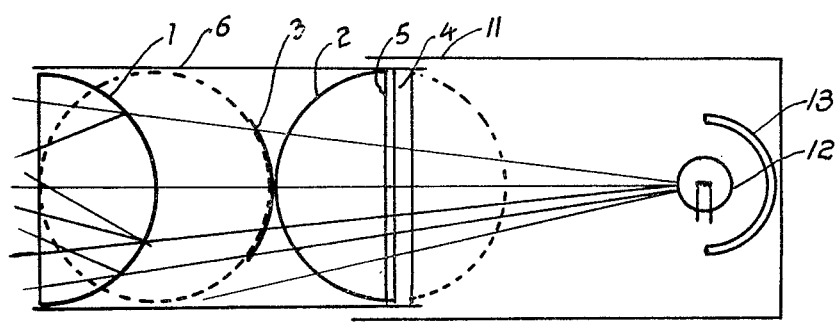
FIG. 9 is a projection means.

In FIG. 9, the same optical arrangement is used as in FIG. 4 with this difference; the iris diaphragm 7 and shutter 8 are disposed of and instead of a photo-sensitive medium 4, a transparency or slide is used. The optical system and transparency or slide telescopes into a lamp housing 11, with a direct source of light 12 and a reflector 13 situated in the rear of housing 11. Spheric lenses offer many advantages over present optical systems. Less illumination is required which permits the taking of indoor pictures without the aid of flash equipment at relatively fast speeds. Spheric lenses optical systems are in focus from object to infinity and eliminate the necessity of focussing. Spheric lenses are especially suited for motion picture and TV cameras and permit the taking of pinhole pictures at normal speeds.

I claim:

1. An optical system comprising a plano-orbicular first element for producing a primary image, and a plano-orbicular second element having the convex surface thereof directed towards the convex surface of said first element, said second element serving to produce a secondary image in a plane in contact with the plane surface of said second element.

2. An optical system comprising a plano-convex objective element for producing a primary image, and a plano-orbicular corrective element having the convex surface thereof directed towards the convex surface of said objective element, said corrective element serving to produce a secondary image in a plane in contact with the plane surface of said corrective element.

3. An optical system composed of an objective element and a corrective element comprising a plano-convex lens being the objective element mounted in a suitable enclosure and a separate enclosure having a transparent plano-orbicular element mounted therein as a corrective element, said corrective element being located at such a distance from said objective element as to intercept, at the focal point thereof, the rays of light transmitted through said objective element.

4. An optical system composed of an objective element and a corrective element comprising a plano-convex lens being the objective element mounted in a suitable enclosure having an iris diaphragm at one end and a separate enclosure composed of a transparent plano-orbicular element as a corrective element, said corrective element being located at such distance from said objective element as to intercept, at the focal point thereof, the rays of light transmitted through said objective element a shutter arrangement and a means to mount a photo-sensitive medium directly behind the corrective element.

5. An optical system including in combination, an objective light gathering means to produce an image free from aberrations and curvature of field comprising a shutter means arranged in operative relationship with an aperture; a plano-orbicular element mounted in a telescoping housing directly in front of mounting means for a photo-sensitive medium with the convex surface of the element directed towards the light gathering means and serving to produce a condensed bright image.

6. An optical system composed of an objective element and a corrective element comprising two plano-convex elements mounted in a suitable enclosure with the flat surfaces of the two elements being at the outer range of the relationship thereof and the curved portions being in relatively close proximity, said plano-convex elements being spaced a distance apart equal to half the diameter of the circle or ellipse formed by the curvature of the objective element having a means to mount a transparency or slide directly behind the corrective element and a separate enclosure with a direct light source with a reflector directly behind said light source.

7. An optical system composed of an objective element and a corrective element comprising two plano-orbicular elements mounted in a suitable enclosure with the flat surfaces of the two elements being at the outer range of the relationship thereof and the curved portions being in a relatively close proximity, said plano-orbicular elements being spaced a distance apart equal to half the diameter of the circle formed by the curvature of the objective element having two light gathering members spaced a distance apart sufficient to create a dual image when seen from different points of view at the same focal point, said distance constituting the pupillary distance of the average human eye, to produce a stereoscopic image through a lenticular ribbed screen and a means to mount a photo-sensitive medium directly behind the lenticular ribbed screen.

8. An optical system composed of an objective element and a corrective element comprising a plano-orbicular lens and a plano-orbicular element mounted in a suitable enclosure, spaced a distance apart equal to half the diameter of the circle formed by the curvature of the objective element and having a single or dual shutter and a mask with two light gathering members positioned in front of said objective element, and a photo-sensitive medium composed of a transparent base having lenticulated ribs engraved or embossed on one side and a photo-sensitive emulsion applied to the other side of the transparent base, positioned in close relationship to the base of the corrective element with the lenticulated ribs of the photo-sensitive medium facing the base of the corrective element.

References Cited

FOREIGN PATENTS 452,323    3/1913    France.
1,245,577   10/1960   France.

NORTON ANSHER, *Primary Examiner.*

RICHARD A. WINTERCORN, *Assistant Examiner.*